United States Patent
D'Souza et al.

(10) Patent No.: US 10,425,402 B2
(45) Date of Patent: *Sep. 24, 2019

(54) CLOUD KEY DIRECTORY FOR FEDERATING DATA EXCHANGES

(71) Applicant: Microsoft Technology Licensing, LLC, Redmond, WA (US)

(72) Inventors: Roy Peter D'Souza, Bellevue, WA (US); Omkant Pandey, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 187 days.

This patent is subject to a terminal disclaimer.

(21) Appl. No.: 15/368,251

(22) Filed: Dec. 2, 2016

(65) Prior Publication Data

US 2017/0085536 A1    Mar. 23, 2017

Related U.S. Application Data

(63) Continuation of application No. 14/956,845, filed on Dec. 2, 2015, now Pat. No. 9,558,370, which is a
(Continued)

(51) Int. Cl.
*H04L 29/06* (2006.01)
*G06F 16/27* (2019.01)
(Continued)

(52) U.S. Cl.
CPC .......... *H04L 63/083* (2013.01); *G06F 16/256* (2019.01); *G06F 16/27* (2019.01);
(Continued)

(58) Field of Classification Search
None
See application file for complete search history.

(56) References Cited

U.S. PATENT DOCUMENTS

| 5,768,388 A | 6/1998 | Goldwasser et al. |
| 6,009,177 A | 12/1999 | Sudia |

(Continued)

OTHER PUBLICATIONS

Melissa Chase, "Multi-Authority attribute based encryption", Feb. 21-24, 2007, TCC'07 Proceedings of the 4th conference of the Theory of cryptography pp. 515-534. (Year: 2007).*

(Continued)

*Primary Examiner* — Kaveh Abrishamkar
(74) *Attorney, Agent, or Firm* — Workman Nydegger

(57) ABSTRACT

Embodiments are directed to securing data using attribute-based encryption. In an embodiment, a computer system encrypts a portion of data with an attribute-based encryption, including associating the encrypted portion of data with one or more encryption attributes. The computer system sends the encrypted portion of data and the one or more encryption attributes to a data store, which stores the first portion of data along with the one or more encryption attributes. The computer system also defines one or more access controls for the portion of data that include an identity of at least one user permitted to access the portion of data. The attribute-based encryption allows the encrypted portion of data to be provided by the data store upon request by the identified user when the request includes one or more search attributes that are relevant to the one or more encryption attributes.

20 Claims, 4 Drawing Sheets

US 10,425,402 B2

Page 2

Related U.S. Application Data continuation of application No. 14/570,808, filed on Dec. 15, 2014, now Pat. No. 9,224,005, which is a continuation of application No. 14/095,130, filed on Dec. 3, 2013, now Pat. No. 8,935,810, which is a continuation of application No. 13/162,985, filed on Jun. 17, 2011, now Pat. No. 8,627,508.

(51) Int. Cl.

| | |
|---|---|
| *G06F 16/25* | (2019.01) |
| *G06F 16/951* | (2019.01) |
| *G06F 16/9535* | (2019.01) |
| *H04L 9/08* | (2006.01) |
| *H04L 9/32* | (2006.01) |
| *G06F 21/62* | (2013.01) |

(52) U.S. Cl.
CPC ........ *G06F 16/951* (2019.01); *G06F 16/9535* (2019.01); *G06F 21/6218* (2013.01); *G06F 21/6254* (2013.01); *H04L 9/0894* (2013.01); *H04L 9/321* (2013.01); *H04L 63/0421* (2013.01); *H04L 63/0428* (2013.01); *H04L 63/08* (2013.01); *H04L 63/104* (2013.01)

(56) References Cited

U.S. PATENT DOCUMENTS

| | | | |
|---|---|---|---|
| 6,993,661 | B1 | 1/2006 | Garfinkel |
| 7,594,275 | B2 | 9/2009 | Zhu et al. |
| 7,661,146 | B2 | 2/2010 | Karimzadeh et al. |
| 7,886,361 | B2 | 2/2011 | Kasahara et al. |
| 7,953,670 | B2 | 5/2011 | Colella |
| 8,281,121 | B2 | 10/2012 | Nath et al. |
| 8,627,508 | B2 * | 1/2014 | D'Souza ............... H04L 9/0894 726/30 |
| 8,935,810 | B2 * | 1/2015 | D'Souza ............... H04L 9/0894 726/30 |
| 9,077,509 | B2 | 7/2015 | Tuyls et al. |
| 9,224,005 | B2 * | 12/2015 | D'Souza ............... H04L 9/0894 |
| 9,558,370 | B2 * | 1/2017 | D'Souza ............... H04L 9/0894 |
| 9,705,850 | B2 * | 7/2017 | Huang ................ H04L 63/0428 |
| 9,992,191 | B2 * | 6/2018 | D'Souza ............... H04L 9/0894 |
| 2002/0012386 | A1 | 1/2002 | Shanbhag |
| 2002/0073102 | A1 | 6/2002 | Okamoto et al. |
| 2003/0012386 | A1 | 1/2003 | Kim et al. |
| 2003/0081785 | A1 | 5/2003 | Boneh et al. |
| 2004/0192349 | A1 | 9/2004 | Reilly |
| 2006/0020550 | A1 | 1/2006 | Fields et al. |
| 2006/0123462 | A1 | 6/2006 | Lunt et al. |
| 2008/0080718 | A1 | 4/2008 | Meijer et al. |
| 2008/0082538 | A1 | 4/2008 | Meijer et al. |
| 2008/0104393 | A1 | 5/2008 | Glasser et al. |
| 2008/0222692 | A1 | 9/2008 | Andersson et al. |
| 2008/0243696 | A1 | 10/2008 | LeVine |
| 2008/0273705 | A1 | 11/2008 | Hasegawa |
| 2009/0150674 | A1 | 6/2009 | Richardson et al. |
| 2009/0150970 | A1 | 6/2009 | Hinds et al. |
| 2009/0177514 | A1 | 7/2009 | Hudis et al. |
| 2009/0228950 | A1 | 9/2009 | Reed et al. |
| 2009/0252330 | A1 | 10/2009 | Patnala et al. |
| 2010/0067689 | A1 | 3/2010 | Laffey |
| 2010/0185863 | A1 | 7/2010 | Rabin et al. |
| 2010/0194782 | A1 | 8/2010 | Gyorfi et al. |
| 2010/0211781 | A1 | 8/2010 | Auradkar et al. |
| 2010/0266132 | A1 | 10/2010 | Bablani et al. |
| 2010/0318812 | A1 | 12/2010 | Auradkar et al. |
| 2011/0119768 | A1 | 5/2011 | Engdahl et al. |
| 2012/0032877 | A1 | 2/2012 | Watkins et al. |
| 2012/0122491 | A1 | 5/2012 | Kim et al. |
| 2012/0170753 | A1 | 7/2012 | Pandrangi et al. |
| 2012/0210255 | A1 | 8/2012 | Ooi et al. |
| 2012/0321086 | A1 | 12/2012 | D'Souza et al. |
| 2014/0090089 | A1 | 3/2014 | D'Souza et al. |
| 2014/0225914 | A1 | 8/2014 | Kasahara et al. |
| 2015/0074401 | A1 | 3/2015 | D'Souza et al. |
| 2015/0074402 | A1 | 3/2015 | D'Souza et al. |
| 2016/0196452 | A1 | 7/2016 | D'Souza et al. |
| 2017/0085554 | A1 | 3/2017 | D'Souza et al. |

OTHER PUBLICATIONS

Office Action dated Sep. 21, 2017 cited in U.S. Appl. No. 15/367,836.
"Understanding Security in Cloud Storage", Retrieved from <<http://www.hubtechnical.com/Collateral/Documents/English-US/Understanding%20Security%20in%20Cloud%20Storage.pdf>>, Jan. 2010, 16 Pages.
"Final Office Action Issued in U.S. Appl. No. 12/424,151", dated May 31, 2012, 14 Pages.
"Non-Final Office Action Issued in U.S. Appl. No. 12/424,151", dated Dec. 27, 2011, 14 pages.
"Final Office Action Issued in U.S. Appl. No. 13/162,950", dated Oct. 8, 2013, 26 Pages.
"Non-Final Office Action Issued in U.S. Appl. No. 13/162,950", dated Apr. 10, 2013, 15 Pages.
"Notice of Allowance Issued in U.S. Appl. No. 13/162,950", dated Jul. 11, 2014, 9 Pages.
"Non-Final Office Action Issued in U.S. Appl. No. 13/162,985", dated Mar. 15, 2013, 15 Pages.
"Notice of Allowance Issued in U.S. Appl. No. 13/162,985", dated Aug. 29, 2013, 6 Pages.
"Non-Final Office Action Issued in U.S. Appl. No. 14/095,130", dated Jul. 30, 2014, 7 Pages.
"Notice of Allowance Issued in U.S. Appl. No. 14/095,130", dated Sep. 10, 2014, 5 Pages.
"Final Office Action Issued in U.S. Appl. No. 14/542,904", dated May 24, 2016, 10 Pages.
"Non Final Office Action Issued in U.S. Appl. No. 14/542,904", dated Feb. 16, 2016, 12 Pages.
"Non-Final Office Action Issued in U.S. Appl. No. 14/542,904", dated Aug. 17, 2016, 6 Pages.
"Non Final Office Action Issued in U.S. Appl. No. 14/546,341", dated Feb. 17, 2016, 10 Pages.
"Non-Final Office Action Issued in U.S. Appl. No. 14/546,341", dated Jun. 6, 2016, 11 Pages.
"Notice of Allowance Issued in U.S. Appl. No. 14/546,341", dated Sep. 29, 2016, 10 Pages.
"Non-Final Office Action Issued in U.S. Appl. No. 14/570,808", dated May 6, 2015, 7 Pages.
"Notice of Allowance Issued in U.S. Appl. No. 14/570,808", dated Aug. 21, 2015, 5 Pages.
"Non-Final Office Action Issued in U.S. Appl. No. 14/956,845", dated Jun. 10, 2016, 8 Pages.
"Notice of Allowance Issued in U.S. Appl. No. 14/956,845", dated Oct. 21, 2016, 6 Pages.
Abelson, et al., "The Risks of Key Recovery, Key Escrow, and Trusted Third-Party Encryption", in World Wide Web Journal—Special Issue: Web Security: A Matter of Trust, vol. 2, Issue 3, May 27, 1997, 20 Pages.
Erotokritou, et al., "An Efficient Secure Shared Storage Service With Fault and Investigative Disruption Tolerance", In Proceedings of the 39th International Conference on Parallel Processing Workshops, Sep. 13, 2010, 9 Pages.
Faatz, et al., "Information Security in the Clouds", In Systems Engineering at MITRE Cloud Computing Series, Aug. 2010, 18 Pages.
Goyal, et al., "Attribute-Based Encryption for Fine-Grained Access Control of Encrypted Data", In Proceedings of the 13th ACM Conference on Computer and Communications Security, Oct. 30, 2006, 28 Pages.
Kamara, et al., "Cryptographic Cloud Storage", In Proceedings of the 14th International Conference on Financial Cryptograpy and Data Security, Jan. 25, 2010, 12 Pages.
Kupcu, Alptekin, "Efficient Cryptography for the Next Generation Secure Cloud", A dissertation submitted in partial fulfillment of the

(56) References Cited

OTHER PUBLICATIONS requirements for the Degree of Doctor of Philosophy in the Department of Computer Science at Brown University, May 2010, 276 Pages.
Lu, et al., "Enhancing Data Privacy in the Cloud", In Proceedings of International Conference on High Performance Computing and Simulation, Jul. 4, 2011, 16 Pages.
Muller, et al., "On Multi-Authority Ciphertext-Policy Attribute-Based Encryption", In Bulletin of the Korean Mathematical Society, vol. 46, Issue 4, Jul. 1, 2009, 17 Pages.
Stadler, Markus, "Publicly Verifiable Secret Sharing", In Proceedings of the 15th Annual International Conference on Theory and Application of Cryptographic Technique, May 12, 1996, 10 Pages.
Wang, et al., "Achieving Fine-Grained Access Control for Secure Data Sharing on Cloud Servers", In Concurrency and Computation: Practice and Experience, Jan. 2000, 27 Pages.
Wang, et al., "Enabling Public Verifiability and Data Dynamics for Storage Security in Cloud Computing", In Proceedings of the 14th European Conference on Research in Computer Security, Sep. 21, 2009, 20 Pages.
Wong, et al., "Verifiable Secret Redistribution for Threshold Sharing Schemes", Central Michigan University, Jan. 2009, 16 Pages.
Yan, et al., "Strengthen Cloud Computing Security with Federal Identity Management Using Hierarchical Identity-Based Cryptography", In Proceedings of the 1st International Conference on Cloud Computing, Nov. 22, 2009, 11 Pages.
Yu, et al., "Achieving Secure, Scalable, and Fine-Grained Data Access Control in Cloud Computing", In Proceedings of the 29th Conference on Information Communications, Mar. 14, 2010, 9 Pages.
Kurihara et al. "A New (k, n)-Threshold Secret Sharing Scheme and Its Extension" KDDI R&D Laboratories, Inc. Sep. 2008.
Notice of Allowance dated Feb. 3, 2017 cited in U.S. Appl. No. 14/542,904.
Notice of Allowance dated Oct. 23, 2017 cited in U.S. Appl. No. 15/376,836.
Office Action dated Apr. 3, 2017 cited in U.S. Appl. No. 14/546,341.
"Non Final Office Action Issued in U.S. Appl. No. 15/608,704", dated Jun. 18, 2018, 12 Pages.
"Final Office Action Issued in U.S. Appl. No. 15/608,704", dated Nov. 5, 2018, 11 Pages.
"Notice of Allowance Issued in U.S. Appl. No. 15/608,704", dated Mar. 28, 2019, 9 Pages.
Denning, et al., "A Taxonomy for Key Escrow Encryption Systems", In Proceeding of Communications of the ACM, vol. 39, Issue 3, Mar. 1, 1996, pp. 34-40.

\* cited by examiner

CLOUD KEY DIRECTORY FOR FEDERATING DATA EXCHANGES

CROSS-REFERENCE TO RELATED APPLICATIONS

This application is a continuation of U.S. patent application Ser. No. 14/956,845, filed Dec. 2, 2015 and entitled "CLOUD KEY DIRECTORY FOR FEDERATING DATA EXCHANGES," which is a continuation of U.S. patent application Ser. No. 14/570,808, filed Dec. 15, 2014 and entitled "CLOUD KEY DIRECTORY FOR FEDERATING DATA EXCHANGES," now U.S. Pat. No. 9,224,005, which is a continuation of U.S. patent application Ser. No. 14/095,130, filed Dec. 3, 2013 and entitled "CLOUD KEY DIRECTORY FOR FEDERATING DATA EXCHANGES," now U.S. Pat. No. 8,935,810, which is a continuation of U.S. patent application Ser. No. 13/162,985, filed Jun. 17, 2011, and entitled "CLOUD KEY DIRECTORY FOR FEDERATING DATA EXCHANGES," now U.S. Pat. No. 8,627,508. This application is also related to U.S. patent application Ser. No. 13/162,950, filed Jun. 17, 2011 and entitled "CLOUD KEY ESCROW SYSTEM," now U.S. Pat. No. 8,891,772, and U.S. patent application Ser. No. 15/367,836, filed Dec. 2, 2016. The entire contents of each of the foregoing applications are incorporated by reference herein in their entireties.

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In some cases, software applications may be designed to interact with other software applications or other computer systems. For example, an application may be designed to store files on a network server. Those files may be stored in one or more directories on the network server. As data storage needs increase, the corresponding directories grow increasingly larger, and may include information that is out-of-date, or is otherwise incorrect. Moreover, customers wishing to share data stored on these directories may only be able to share the data in an all-or-nothing fashion, such that their data is available to all users or to no users.

BRIEF SUMMARY

Embodiments described herein are directed generally to facilitating data transfer using an anonymous directory, and to providing attribute-based data access to identified user using attribute-based encryption. In one embodiment, securing data includes encrypting a portion of data with an attribute-based encryption, including associating the encrypted portion of data with one or more encryption attributes. The encrypted portion of data and the one or more encryption attributes are sent to a data store, which stores the first portion of data along with the one or more encryption attributes. One or more access controls for the portion of data are defined, including an identity of at least one user permitted to access the portion of data. The attribute-based encryption allows the encrypted portion of data to be provided by the data store upon request by the identified user when the request includes one or more search attributes that are relevant to the one or more encryption attributes.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
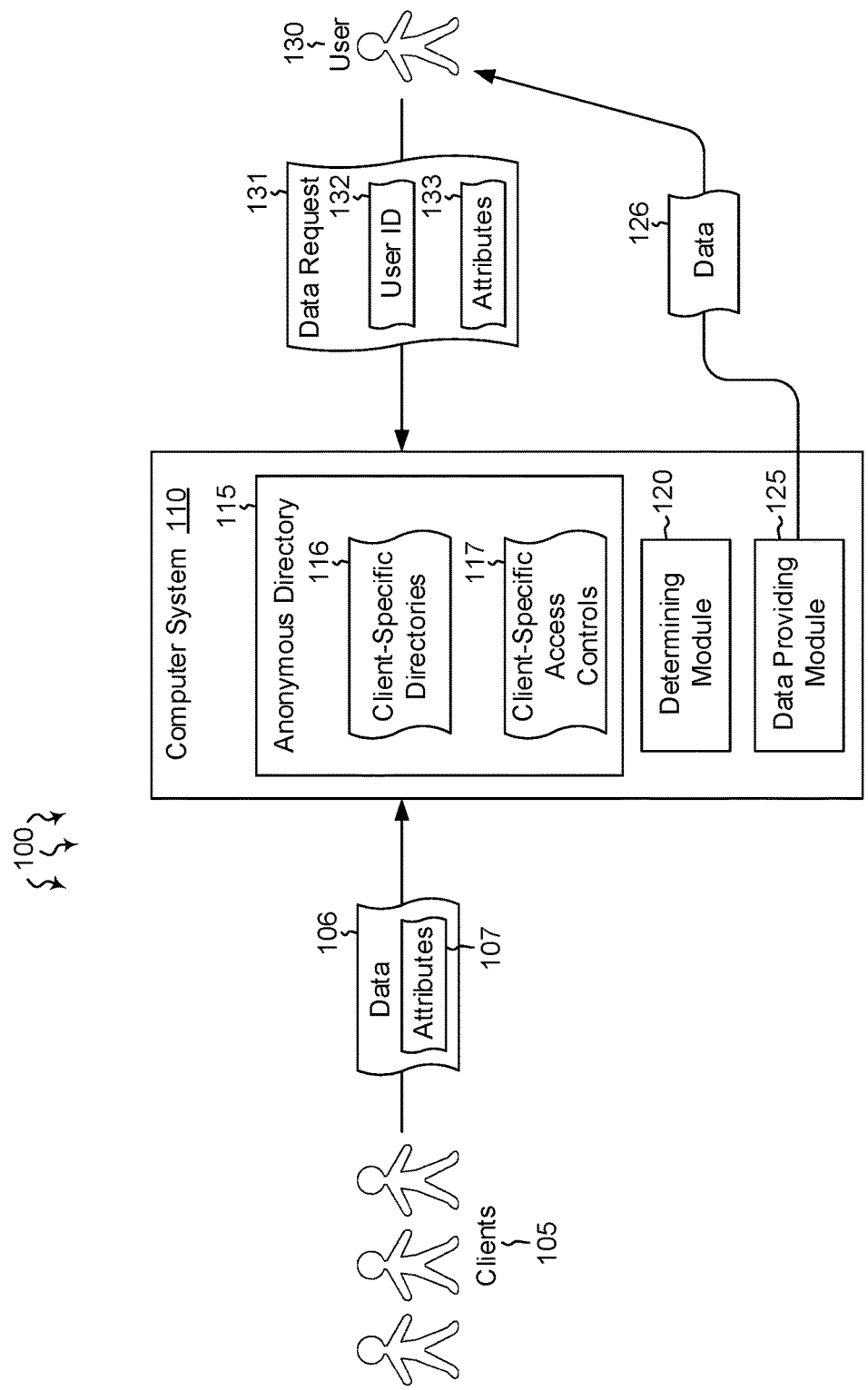
FIG. 1 illustrates a computer architecture in which embodiments of the present invention may operate including facilitating data transfer using an anonymous directory.

Embodiments described herein are directed to facilitating data transfer using an anonymous directory and to providing attribute-based data access to identified users. In one embodiment, a computer system instantiates an anonymous directory that stores data in various client-specific directories for different clients. The anonymous directory is configured to provide data access according to access controls defined and managed by the client. The computer system receives a data request from a user that identifies the user and specifies a portion of data that is to be returned to the user. The computer system determines which of the client's data is to be returned to the user based on the client's specified access controls. The access controls grant access to specified data in some of the client-specific directories, based on the user's identity. The computer system then provides the determined data to the user.

In another embodiment, a computer system receives encrypted data from a client that is to be stored in a client-specific directory. The data is encrypted using multi-authority attribute-based encryption. As such, the client can specify access rights to the encrypted data by allowing identified users to access data with certain specified attributes. The computer system receives a data request from a user, where the data request includes the user's identity and specifies various data attributes. Any data that includes those attributes is to be returned to the user. The computer system determines which portions of data have attributes that match the requested attributes specified by the user. This data is then identified as being allowable to release to the identified user. The computer system then sends to the user those portions of data whose attributes match the requested attributes specified by the user.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions in the form of data are computer storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium which can be used to store desired program code means in the form of computer-executable instructions, data or data structures and which can be accessed by a general purpose or special purpose computer.

A "network" is defined as one or more data links and/or data switches that enable the transport of electronic data between computer systems and/or modules and/or other electronic devices. When information is transferred or provided over a network (either hardwired, wireless, or a combination of hardwired or wireless) to a computer, the computer properly views the connection as a transmission medium. Transmissions media can include a network which can be used to carry data or desired program code means in the form of computer-executable instructions or in the form of data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC"), and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems that are linked (either by hardwired data links, wireless data links, or by a combination of hardwired and wireless data links) through a network, each perform tasks (e.g. cloud computing, cloud services and the like). In a distributed system environment, program modules may be located in both local and remote memory storage devices.

FIG. 1 illustrates a computer architecture 100 in which the principles of the present invention may be employed. Computer architecture 100 includes computer system 110. Computer system 110 may be any type of local or distributed computer system, including a vast system of interconnected computer systems commonly referred to as "the cloud". Computer system 110 may include different modules and systems that are designed to perform specific functions. For instance, the anonymous directory 115 may be used to store users' information. The anonymous directory may include many different client-specific directories 116 that correspond to each client. Thus, for example, each of clients 105 may have their own client-specific directory that stores each client's data 106.

In some cases, the client may want to encrypt their data, so that their data is protected from viewing by other parties. This encrypted data may be stored in the clients' client-specific directories 116. The client may, however, in some circumstances, want to make portions of their data (encrypted or otherwise) available to other users. In such cases, the data may be encrypted using multi-authority, attribute-based encryption. This type of encryption allows the encrypted data to be stored with certain attributes 107 associated therewith. The data may then be accessed using those attributes, along with the requesting user's confirmed identity. This process will be explained in greater detail below with regard to methods 200 and 300 of FIGS. 2 and 3, respectively.

Figure 2:
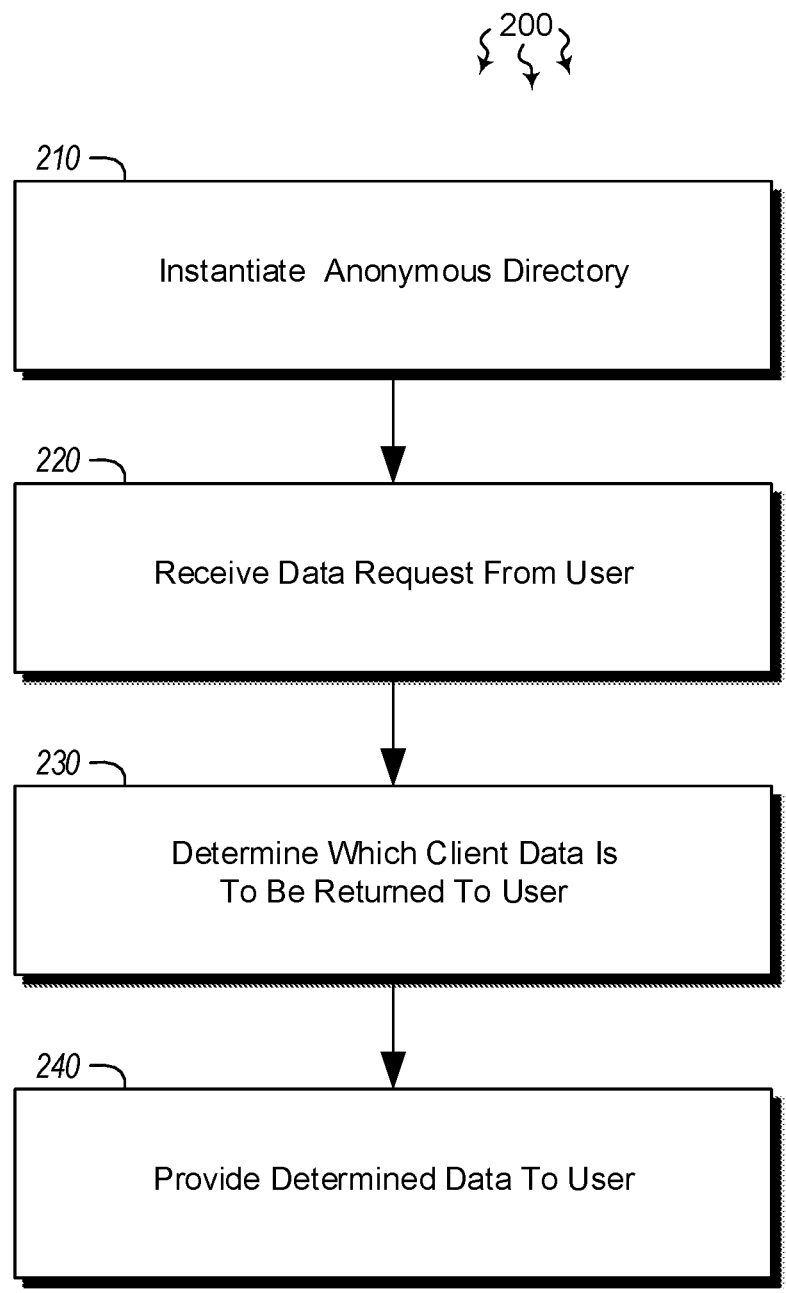
FIG. 2 illustrates a flowchart of an example method for facilitating data transfer using an anonymous directory.
Figure 3:
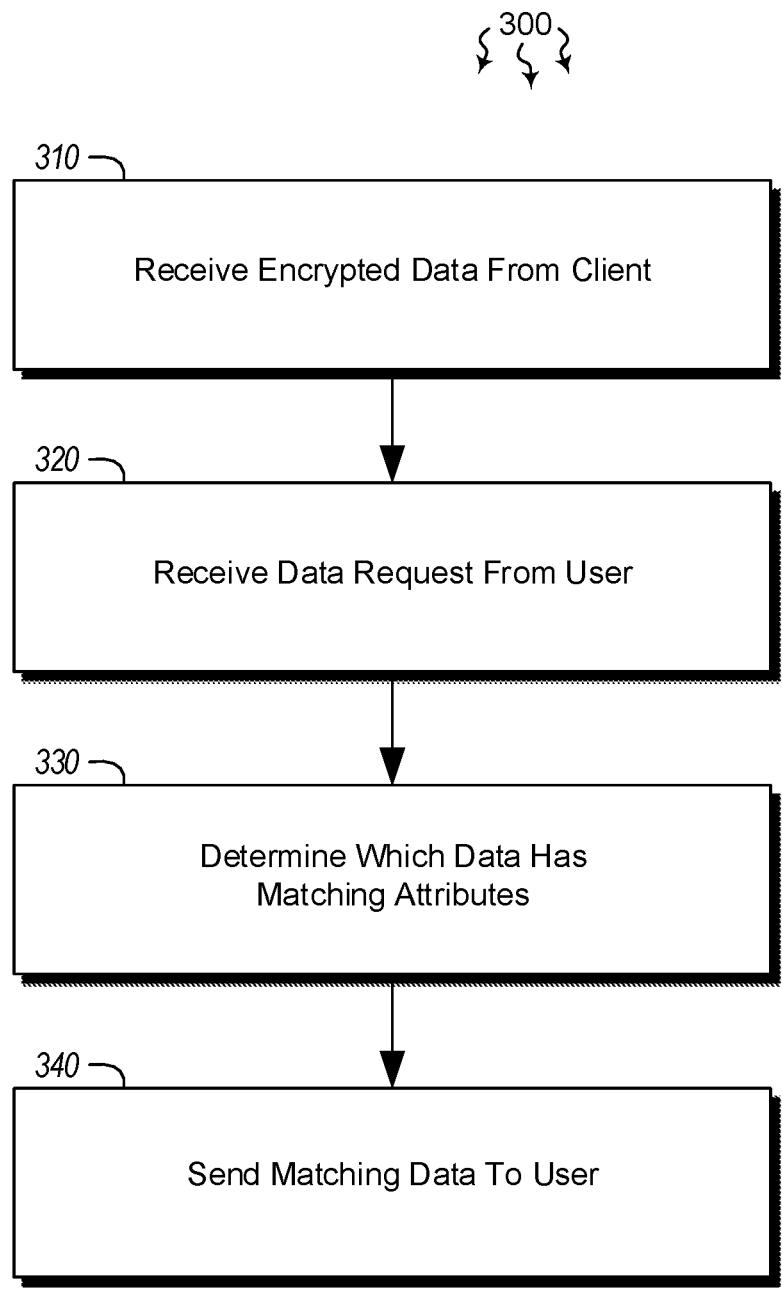
FIG. 3 illustrates a flowchart of an example method for providing attribute-based data access to identified users.

In view of the systems and architectures described above, methodologies that may be implemented in accordance with the disclosed subject matter will be better appreciated with reference to the flow charts of FIGS. 2 and 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for facilitating data transfer using an anonymous directory. The method 200 will now be described with frequent reference to the components and data of environment 100.

Method 200 includes an act of instantiating an anonymous directory that stores data in one or more client-specific directories for a plurality of different clients, wherein the anonymous directory is further configured to provide data access according to access controls defined and managed by the client (act 210). For example, computer system 110 may instantiate and manage anonymous directory 115. The anonymous directory stores client data 106 in client-specific directories 116 for multiple different clients 105. The client's data is managed according to access controls defined and managed by the client. Accordingly, using the client-specific access controls 117, each client can manage how their data is stored and who is allowed to access their data.

Each client's data may be encrypted before being stored in the anonymous directory. The data may be encrypted using multi-authority attribute-based encryption. Such encryption associates attributes 107 with the encrypted data. In some cases, the clients' data may be accessed by users searching for data with these attributes. The client may specify in their access controls that certain users (e.g. 130) may access data with certain attributes. Using multi-authority attribute-based encryption ensures that no single party that can hand out all of the keys to look at the encrypted data. In some cases, each client (e.g. each company) may be an authority. Each client can selectively expose data (e.g. product pricing or details) based on a runtime decision of who the buyer is. Multi-authority attribute-based encryption allows clients to encrypt their data and put their (potentially) sensitive business data in their directory in the computer system (e.g. in the cloud). The data may be encrypted before it is sent up to the cloud, so that the cloud can take ownership of encrypted data. Then off-cloud, the client maintains fine-grained control over the data by providing keys or otherwise allowing third parties to access the data.

For instance, one of clients 105 may be a merchant selling widgets. User 130 may be a buyer that wants to buy widgets. The user may not know about the client, but may search for data about widgets. The user may send data request 131 to the computer system, along with the user's ID (identifying the user as a buyer) and attributes the user is searching for (in this case, widgets). The anonymous directory may then, according to the client's access control policy, allow the user to access those portions of client data that have to do with the widget. Accordingly, the client's data may be safely stored, while still allowing access to interested third parties, according to the client's self-defined access control policies.

The anonymous directory may thus allow data owners to specify which data is presented in a search result. Those search results may be user-specific, such that each user, based on their ID, may receive different search results, even when searching for the same terms or attributes 133. Additionally or alternatively, the anonymous directory may allow data owners to specify which data is presented in a search result for different user types. Thus, as above, the search results may be user-type-specific, such that each user type, as indicated in their user ID 132, may receive different search results, even when searching for the same terms or attributes.

In some embodiments, the anonymous directory allows data owners to dynamically change which data is presented in a given search result. Thus, if a data owner (client 105) wanted to allow more or fewer users or user types to access a certain portion of data, the data owner could update their access controls and make the appropriate changes. In some cases, the data owner may convert the data request 131 received from the user based on the user's identity. The request may be converted into a form that uniquely identifies the user and the requested data and/or attributes. The converted request may be used to provide that user with a specified set of data, as indicated by the client in their access controls.

When the data owner uploads their data, the data may be encrypted or unencrypted. As such, any encrypted data may remain invisible to the anonymous directory. The anonymous directory then becomes an intermediary and transmits the client's encrypted data without seeing what it is. In other cases, the data may be unencrypted, and the anonymous directory may be able to see what it is. In either case, the data may be made available to other users, and may appear in other users' searches according to the user's access controls.

Method 200 includes an act of receiving a data request from a user that identifies the user and specifies a portion of data that is to be returned to the user (act 220). For example, computer system 110 may receive data request 131 from user 130. The data request includes user ID 132 and one or more attributes 133 of data that is to be returned to the user. For instance, the user may request a registered salesperson at a jewelry company in Antwerp, Belgium. The request may include these attributes, including "registered", "salesperson", "jewelry company" and "Antwerp, Belgium". The anonymous directory may search to see whether any clients have uploaded data with attributes that match the above-requested attributes. If such a client has uploaded information and has granted access to such using their access controls, that information is sent to the user (e.g. data 126). If the client's data was encrypted using multi-authority attribute-based encryption, the client will have specified access rights to the encrypted data, and will allow identified users to access data that has those specified attributes.

The anonymous directory may also allow discovery of clients' data based on a threshold number of attributes being requested in the user's request. Accordingly, in the above example, if the user had included five attributes in his or her request, and the client had specified in the access controls that the data was to be released if at least three of the attributes were requested, then the threshold would be met and the data would be released. The determining module 120 may determine which of the client's data is to be returned to the user based on the client's specified access controls (act 230). The access controls are customizable and dynamically changeable. The access controls grant access to specified data in one or more client-specific directories, based on the user's identity. The user may be authenticated to verify his or her identity. The anonymous directory may then perform the search using the user's identity and specified data attributes. In some cases, the client may send to the user a set of attributes that the user can search for regarding the client's data. After finding the appropriate data, the data providing module 125 may provide the requested data 126 to the user (act 240).

Figure 4:
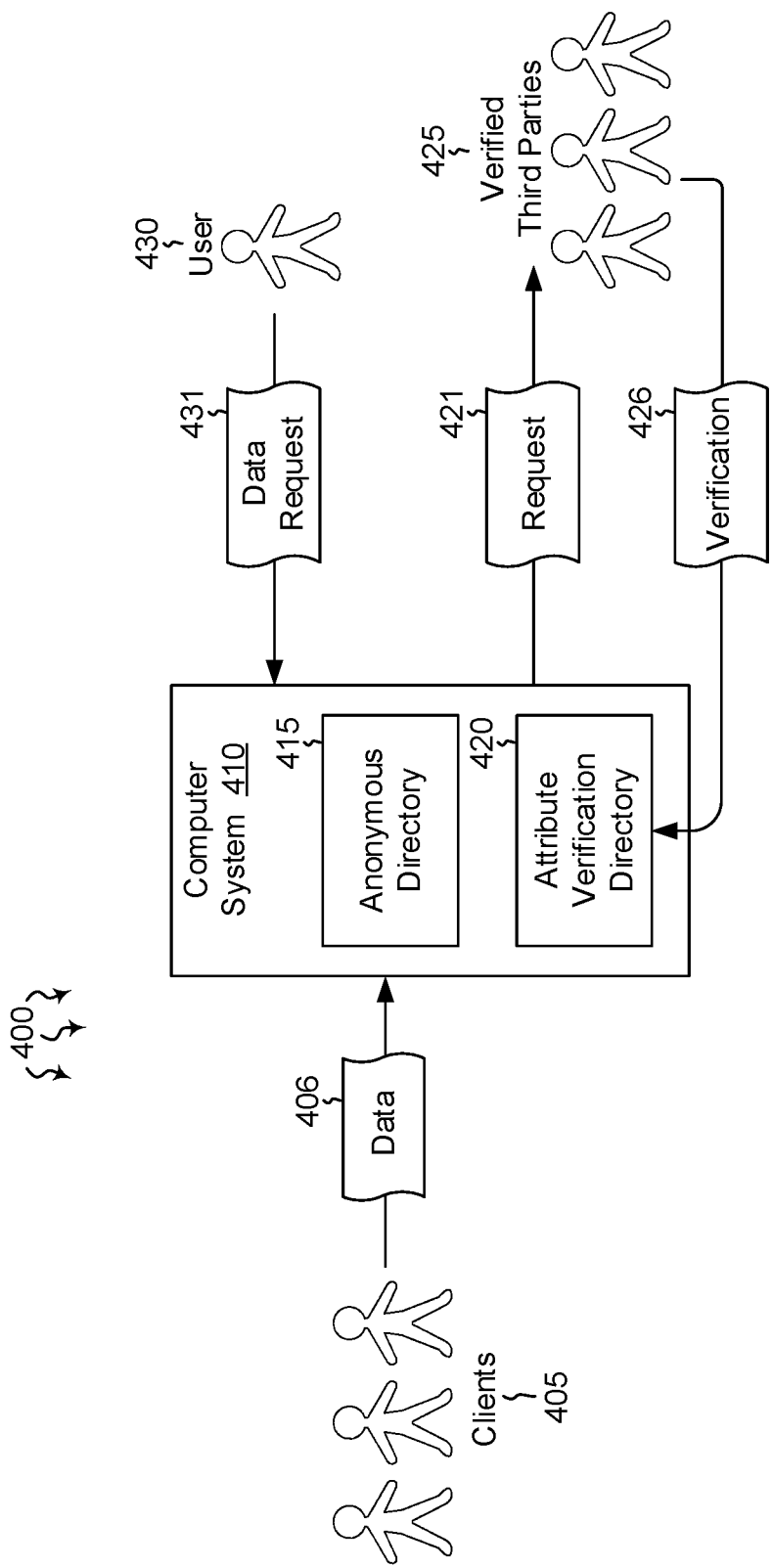
FIG. 4 illustrates a computer architecture in which attribute-based data access is provided to identified users.

Turning now to FIG. 3, FIG. 3 illustrates a flowchart of a method 300 for providing attribute-based data access to identified users. The method 300 will now be described with frequent reference to the components and data of environments 100 and 400 of FIGS. 1 and 4, respectively.

Method 300 includes an act of receiving encrypted data from a client that is to be stored in a client-specific directory, the data being encrypted using multi-authority attribute-based encryption, such that the client specifies access rights to the encrypted data by allowing identified users to access data with certain specified attributes (act 310). For example, computer system 410 may receive data 406 from client 405 that is to be stored in a client-specific directory 116 in anonymous directory 415.

The data may have been encrypted using multi-authority attribute-based encryption which allows the client to specify access rights 117 for the data. The access rights allow identified users (e.g. 430) to access certain types of data that have certain attributes. These attributes may be applied to each portion of data stored in the client-specific directory by the client him- or herself. The attributes applied by the client are user-specific. As such, identified users receive different data based on their identity. If, for example, a user is querying the directory for data of another party, the user can only look at that data selectively based on the attributes that the owner is willing to provide to the recipient.

Method 300 includes an act of receiving a data request from a user, wherein the data request includes the user's identity and specifies one or more data attributes, wherein data that includes those attributes is to be returned to the user (act 320). For example, computer system 410 may receive data request 431 from user 430. The data request may include the user's ID 132 and various specified attributes 133. The attributes indicate data or are associated with data which the user would like to retrieve.

In some embodiments, the user's query may be sent to multiple different authorities requesting specific attributes. Each of the authorities may receive the query and respond with the appropriate attribute(s). The computer system may then receive these attributes from the authorities and allow the user access to the data corresponding to the attributes returned by the authorities. Thus, by using multi-authority attribute-based encryption, the user can rely on other authorities to provide attributes and/or data to respond to the user's request. The authorities do not have to be online at the time of the request. The authorities may reply asynchronously, upon confirming the user's ID. In cases where the attributes are not returned by the authorities, the user is prevented from accessing the data that corresponds to those attributes.

Method 300 includes an act of determining which portions of data have attributes that match the requested attributes specified by the user and are identified as being allowable to release to the identified user (act 330). For example, determining module 120 may determine which portions of data have attributes 107 that match the requested attributes 133 specified by the user 130 and have been indicated by the client (in access controls 117) as being ok to release to the identified user. In some cases, these attributes may be verified by a trusted third party 425. Thus, the attribute verification module 420 may send request 421 to one or more of the trusted third parties for verification. The trusted third parties may reply with verification 426 indicating that the attribute is or is not verified. In one example, for instance, the attribute may be "Certified Notary Public". A trusted third party may vouch for the Notary, indicating that they are legitimate. Those portions of data whose attributes match the requested attributes specified by the user may then be sent to the user (act 340).

Accordingly, methods, systems and computer program products are provided which facilitate data transfer between data owners and users using an anonymous directory. Moreover, methods, systems and computer program products are provided which provide attribute-based data access to identified users. As such, the data owner has fine-grained control over what is being seen and who is seeing it.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A method, implemented at a computer system that includes one or more processors, for securing data using attribute-based encryption, the method comprising:
   encrypting a portion of data using multi-authority attribute-based encryption, the portion of data having a data owner;
   associating the encrypted portion of data with one or more encryption attributes;
   storing the encrypted portion of data and the one or more encryption attributes in a data store, which stores the encrypted portion of data along with the one or more encryption attributes; and
   defining one or more access controls for the portion of data that include an identity of a plurality of users permitted to access some or all of the portion of data, the plurality of users being distinct from the data owner, wherein the attribute-based encryption allows some or all of the encrypted portion of data to be provided by the data store upon receiving a request that includes a confirmed identity of at least one of the plurality of users permitted to access the portion of data and at least a threshold number of the one or more encryption attributes, the particular sub-portion of the portion of data being provided to the at least one user being determined by the confirmed identity of the at least one user and the at least a threshold number of encryption attributes provided in the request.

2. The method of claim 1, wherein the identity of the at least one user is defined based on a user identifier.

3. The method of claim 1, wherein the identity of the at least one user is defined based on a user group.

4. The method of claim 1, wherein the encrypted portion of data is stored in a client-specific directory at the data store.

5. The method of claim 4, wherein the data store includes a plurality of client-specific directories for a plurality of different clients.

6. The method of claim 1, further comprising subsequently updating at least one of the one or more access controls or the one or more encryption attributes.

7. The method of claim 1, wherein the data store comprises an anonymous directory.

8. The method of claim 1, wherein the portion of data comprises a first portion of data, the one or more encryption attributes comprise one or more first encryption attributes, the one or more access controls comprise one or more first access controls, and the one or more search attributes comprise one or more first search attributes, the method further comprising:

encrypting a second portion of data with the attribute-based encryption, including associating the encrypted second portion of data with one or more second encryption attributes;

sending the encrypted second portion of data and the one or more second encryption attributes to the data store, which stores the second portion of data along with the one or more second encryption attributes; and defining one or more second access controls for the second portion of data that include the identity of the least one user, wherein the attribute-based encryption allows the encrypted second portion of data to be provided by the data store upon request by the identified user when the request includes one or more second search attributes that are relevant to the one or more second encryption attributes.

9. The method of claim 8, wherein the attribute-based encryption also allows both the encrypted first portion of data and the encrypted second portion of data to be provided by the data store upon request by the identified user when the request includes both the one or more first search attributes and the one or more second search attributes.

10. A computer system, comprising:
one or more processors; and
one or more computer-readable media having stored thereon computer-executable instructions that are executable by the one or more processors to cause the computer system to secure data using attribute-based encryption, the computer-executable instructions including instructions that are executable to cause the computer system to perform at least the following:
encrypt a portion of data using multi-authority attribute-based encryption, the portion of data having a data owner;
associate the encrypted portion of data with one or more encryption attributes;
store the encrypted portion of data and the one or more encryption attributes in a data store, which stores the encrypted portion of data along with the one or more encryption attributes; and
define one or more access controls for the portion of data that include an identity of a plurality of users permitted to access some or all of the portion of data, the plurality of users being distinct from the data owner, wherein the attribute-based encryption allows some or all of the encrypted portion of data to be provided by the data store upon receiving a request that includes a confirmed identity of at least one of the plurality of users permitted to access the portion of data and at least a threshold number of the one or more encryption attributes, the particular sub-portion of the portion of data being provided to the at least one user being determined by the confirmed identity of the at least one user and the at least a threshold number of encryption attributes provided in the request.

11. The computer system of claim 10, wherein the identity of the at least one user is defined based on a user identifier.

12. The computer system of claim 10, wherein the identity of the at least one user is defined based on a user group.

13. The computer system of claim 10, wherein the encrypted portion of data is stored in a client-specific directory at the data store.

14. The computer system of claim 13, wherein the data store includes a plurality of client-specific directories for a plurality of different clients.

15. The computer system of claim 10, the computer-executable instructions also including instructions that are executable to cause the computer system to subsequently updating at least one of the one or more access controls or the one or more encryption attributes.

16. The computer system of claim 10, wherein the data store comprises an anonymous directory.

17. The computer system of claim 10, wherein the portion of data comprises a first portion of data, the one or more encryption attributes comprise one or more first encryption attributes, the one or more access controls comprise one or more first access controls, and the one or more search attributes comprise one or more first search attributes, the computer-executable instructions also including instructions that are executable to cause the computer system to perform at least the following:
encrypt a second portion of data with the attribute-based encryption, including associating the encrypted second portion of data with one or more second encryption attributes;
send the encrypted second portion of data and the one or more second encryption attributes to the data store, which stores the second portion of data along with the one or more second encryption attributes; and
define one or more second access controls for the second portion of data that include the identity of the least one user, wherein the attribute-based encryption allows the encrypted second portion of data to be provided by the data store upon request by the identified user when the request includes one or more second search attributes that are relevant to the one or more second encryption attributes.

18. The computer system of claim 10, wherein the attribute-based encryption also allows both the encrypted first portion of data and the encrypted second portion of data to be provided by the data store upon request by the identified user when the request includes both the one or more first search attributes and the one or more second search attributes.

19. A computer program product comprising one or more hardware storage devices having stored thereon computer-executable instructions that are executable by one or more processors to cause a computer system to secure data using attribute-based encryption, the computer-executable instructions including instructions that are executable to cause the computer system to perform at least the following:
encrypt a portion of data using multi-authority attribute-based encryption, the portion of data having a data owner;
associate the encrypted portion of data with one or more encryption attributes;
store the encrypted portion of data and the one or more encryption attributes in a data store, which stores the encrypted portion of data along with the one or more encryption attributes; and
define one or more access controls for the portion of data that include an identity of a plurality of users permitted to access some or all of the portion of data, the plurality of users being distinct from the data owner, wherein the attribute-based encryption allows some or all of the encrypted portion of data to be provided by the data store upon receiving a request that includes a confirmed identity of at least one of the plurality of users permitted to access the portion of data and at least a threshold number of the one or more encryption attributes, the particular sub-portion of the portion of data being provided to the at least one user being determined by the confirmed identity of the at least one user and the at least a threshold number of encryption attributes provided in the request.

20. The computer program product of claim 19, wherein the portion of data comprises a first portion of data, the one or more encryption attributes comprise one or more first encryption attributes, the one or more access controls comprise one or more first access controls, and the one or more search attributes comprise one or more first search attributes, the computer-executable instructions also including instructions that are executable to cause the computer system to perform at least the following:

encrypt a second portion of data with the attribute-based encryption, including associating the encrypted second portion of data with one or more second encryption attributes;

send the encrypted second portion of data and the one or more second encryption attributes to the data store, which stores the second portion of data along with the one or more second encryption attributes; and define one or more second access controls for the second portion of data that include the identity of the least one user, wherein the attribute-based encryption allows the encrypted second portion of data to be provided by the data store upon request by the identified user when the request includes one or more second search attributes that are relevant to the one or more second encryption attributes, and wherein the attribute-based encryption also allows both the encrypted first portion of data and the encrypted second portion of data to be provided by the data store upon request by the identified user when the request includes both the one or more first search attributes and the one or more second search attributes.

* * * * *